(12) United States Patent
Iwatschenko-Borho et al.

(10) Patent No.: US 9,778,384 B1
(45) Date of Patent: Oct. 3, 2017

(54) METHOD OF OPERATIONAL STATUS VERIFICATION FOR A NEUTRON DETECTING DEVICE

(71) Applicant: THERMO FISHER SCIENTIFIC MESSTECHNIK GMBH, Erlangen (DE)

(72) Inventors: Michael Iwatschenko-Borho, Erlangen (DE); Reinhard Loew, Erlangen (DE)

(73) Assignee: Thermo Fisher Scientific Messtechnik GmbH, Erlangen (DE)

( * ) Notice: Subject to any disclaimer, the term of this patent is extended or adjusted under 35 U.S.C. 154(b) by 0 days.

(21) Appl. No.: 15/163,212

(22) Filed: May 24, 2016

(51) Int. Cl.
*G01T 3/00* (2006.01)
(52) U.S. Cl.
CPC ..................... *G01T 3/00* (2013.01)
(58) Field of Classification Search
CPC .............. G01T 3/00; G01T 3/02; G01T 7/00
See application file for complete search history.

(56) References Cited

U.S. PATENT DOCUMENTS

| | | | | |
|---|---|---|---|---|
| 4,047,027 A * | 9/1977 | Bateman | ............... | G01V 5/107 250/264 |
| 7,544,927 B1 | 6/2009 | Iwatschenko-Borho | | |
| 2004/0189467 A1 | 9/2004 | Saubolle | | |
| 2013/0299687 A1* | 11/2013 | Scott | ..................... | G01V 5/107 250/269.2 |

FOREIGN PATENT DOCUMENTS

| | | |
|---|---|---|
| EP | 1583007 A2 | 10/2005 |
| JP | 05297184 A * | 11/1993 |
| JP | 2004212337 | 7/2004 |

OTHER PUBLICATIONS

Eroshenko et al., "Relationships between cosmic ray neutron flux and rain flows," ECRS 2008, Kosice, Sep. 8-12, 2008, 5 pgs.
Gordon et al., "Measurement of the Flux and Energy Spectrum of Cosmic-Ray Induced Neutrons on the Ground," IEEE Transactions on Nuclear Science, 51(6), 3427-3434, 2004.
Hendrick and Edge, Cosmic-Ray neutrons near the Earth, Physical Review, 1966, 1023-1025, 145(4).
(Continued)

*Primary Examiner* — Marcus Taningco
(74) *Attorney, Agent, or Firm* — Ion C. Abraham (57) ABSTRACT

A method of verifying the operational status of a neutron detecting device includes at least partially enclosing a neutron detecting device including a neutron detector in a container having outer walls comprising a thermal neutron absorber material, and determining an attenuated neutron count rate of the neutron detecting device. The method then includes removing the neutron detecting device from the container, exposing the neutron detecting device to neutron radiation originating from cosmic ray background, determining an operational neutron count rate of the neutron detecting device, determining a ratio between the operational neutron count rate and the attenuated neutron count rate, and verifying the operational status of the neutron detecting device if the operational neutron count rate is higher than the attenuated neutron count rate by at least a predetermined amount and the ratio is in a predetermined range.

14 Claims, 7 Drawing Sheets

(56) References Cited

OTHER PUBLICATIONS

Kowatari et al., "Altitude Variation of cosmic-ray neutron energy spectrum and ambient dose equivalent at Mt. Fuji in Japan," presented at IRPA 11, Madrid, May 2004.
Kowatari et al., "Evaluation of the Altitude Variation of the Cosmic-ray Induced Environmental Neutrons in the Mt. Fuji Area," Journal of Nuclear Science and Technology, 42(6), 495-502, 2005.
Kowatari et al., "Sequential monitoring of cosmic-ray neutrons and ionizing components in Japan," 9 pages, presented at IRPA 11, Madrid, May 2004.
Nakamura, "Cosmic-ray Neutron Spectrometry and Dosimetry," Journal of Nuclear Science and Technology, Supplement 5, 1-7, 2008.

* cited by examiner

METHOD OF OPERATIONAL STATUS VERIFICATION FOR A NEUTRON DETECTING DEVICE

FIELD OF THE INVENTION

The present invention is generally directed to a method of verifying the operational status of a neutron detecting device.

BACKGROUND

Users of instruments for the sensitive detection and analysis of gamma and neutron radiation often face difficulties with reliable verification of the instrument performance and calibration that typically requires the usage of suitable gamma and neutron check sources. This may not be a big obstacle for radionuclide laboratories and users in the nuclear industry, but other users, such as law enforcement officers, do not have suitable means to regularly test and verify the performance of their radiation detection equipment. Sending the equipment to a calibration laboratory corresponds to a significant increase in the cost of ownership and a reduction of the availability of the instrument. In particular, personal radiation detectors (PRD) or spectroscopic radiation detectors (SPRD) that are designed to be used by law enforcement personnel, fall under the described problem regarding the missing presence of suitable man-made check sources.

Regarding the gamma radiation detector, there are some established solutions using natural radioactivity (primordial isotopes). For example, natural Lutetium test adapters containing primordial Lu-176 or natural Potassium containing primordial K-40 can be used as a safe way to verify the performance of PRD or SPRD devices. See U.S. Pat. No. 7,544,927, hereby incorporated by reference in its entirety (however, where anything in the incorporated reference contradicts anything stated in the present application, the present application prevails). No such natural radionuclides, however, exist to test the neutron detector. Ownership of a man-made neutron source on the other hand is prone to significant administrative problems and may as well relate to radiation protection issues. Consequently, the neutron detector in such PRD and SPRD devices is usually checked very infrequently or not at all. Unlike the gamma radiation background of typically 5 to 50 counts per second (cps), the neutron radiation background count rate of those devices is extremely low (<<1 cps), so operators are accustomed to seeing a zero count rate in the display of those devices and may not get alerted by a defective neutron detector. Manufacturers can set a neutron fail rate threshold in the instrument, but the neutron background during operation may be locally extremely low (e.g., for usage in an underground location such as a metro system). Therefore, in order to avoid a false failure message of the instrument, this state-of-health indication may only detect a total failure of the detector (e.g., several hours with no count).

There is, therefore, a need for a method to verify the operational status and to calibrate the sensitivity of neutron detectors, such as portable neutron detectors, without usage of a conventional neutron source such as AmBe or Cf-252.

SUMMARY

In one embodiment, a method of verifying the operational status of a neutron detecting device includes at least partially enclosing a neutron detecting device including a neutron detector in a container having outer walls comprising a thermal neutron absorber material, and determining an attenuated neutron count rate of the neutron detecting device. The method then includes removing the neutron detecting device from the container, exposing the neutron detecting device to neutron radiation originating from cosmic ray background, determining an operational neutron count rate of the neutron detecting device, determining a ratio between the operational neutron count rate and the attenuated neutron count rate, and verifying the operational status of the neutron detecting device if the operational neutron count rate is higher than the attenuated neutron count rate by at least a predetermined amount and the ratio is in a predetermined range. The container can have at least one outer wall comprising the thermal neutron absorber material at least partially covering the neutron detector. The thermal neutron absorber material can include at least one of Boron (B), Lithium (Li), Cadmium (Cd), and Gadolinium (Gd). In certain embodiments, the predetermined range can be between 4 and 10.

In some embodiments, the method can further include placing the neutron detecting device in direct contact with a neutron moderator device before exposing the neutron detecting device to neutron radiation originating from cosmic ray background, and determining an enhanced neutron count rate of the neutron detecting device. The neutron moderator device can include at least one of polyethylene (PE), polymethylmethacrylate (PMMA), and water. The neutron moderator device can be a hemispherical enclosure or a plate. In some embodiments, the neutron moderator device can further include a high atomic number material, such as at least one of lead (Pb), tin (Sn), or Tungsten (W). In the embodiments including the neutron moderator device, the method can further include determining a neutron detection efficiency of the neutron detector based on the difference between the enhanced neutron count rate and the attenuated neutron count rate, thereby calibrating the neutron detecting device. In some embodiments, determining the attenuated neutron count rate can be performed in a basement of a building, and the method can further include placing the neutron detecting device that is in direct contact with the neutron moderator device on or directly under a roof of the building, a vertical mass layer between the basement and the roof of the building being at least 250 $g/cm^2$.

In certain embodiments, the method can further include, after enclosing the neutron detecting device in the container having outer walls comprising a thermal neutron absorber material, flying the container at an altitude suitable for a commercial airliner between a first location and a second location, removing the neutron detecting device from the container at the second location, placing the neutron detecting device in direct contact with a neutron moderator device, and then flying the neutron detecting device at substantially the same altitude back to the first location.

The invention has many advantages, including enabling verifying the operational status of a neutron detecting device and calibrating the neutron detecting device.

BRIEF DESCRIPTION OF THE DRAWINGS

Like reference numerals refer to corresponding parts throughout the several views of the drawings.

DETAILED DESCRIPTION OF EMBODIMENTS

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Figure 1:
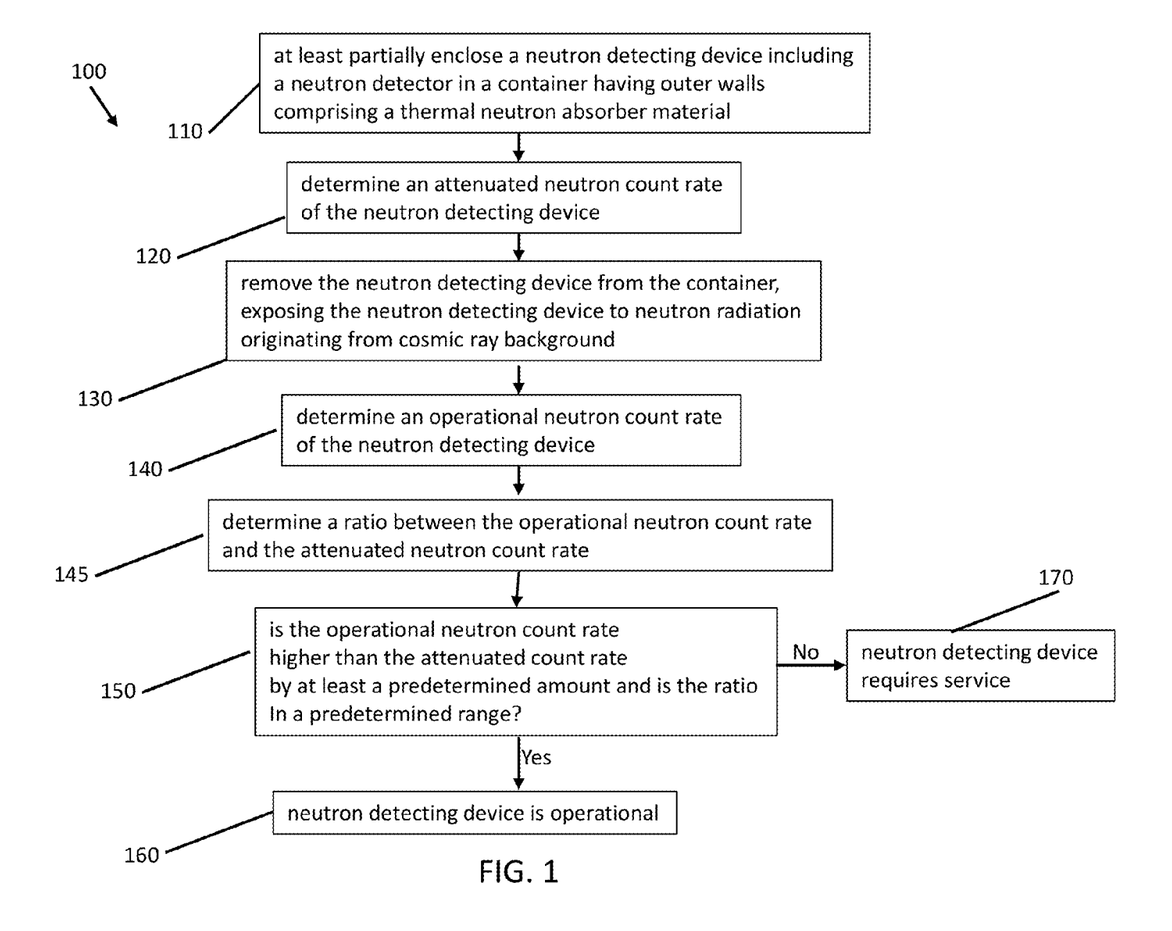
FIG. 1 is a flowchart of a method of operational status verification for a neutron detecting device according to an exemplary embodiment of the invention.
Figure 2A:
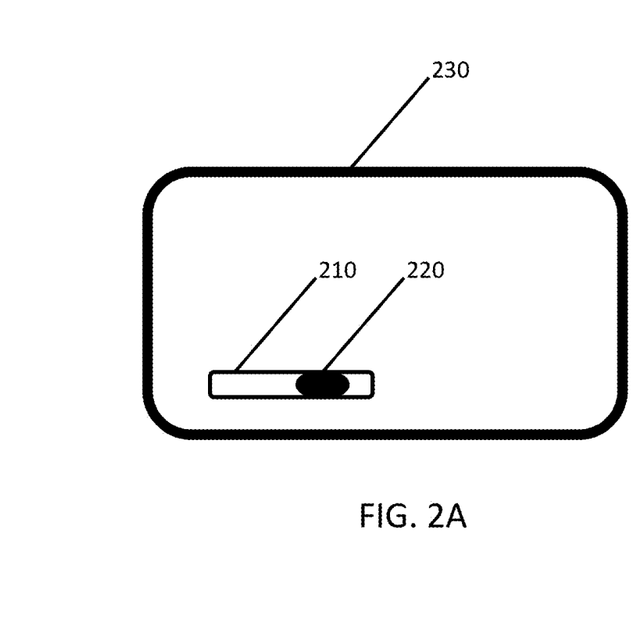
FIG. 2A is a schematic illustration of a neutron detecting device inside a container having outer walls comprising a thermal neutron absorber material according to an exemplary embodiment of the invention.
Figures 2B, 2C:
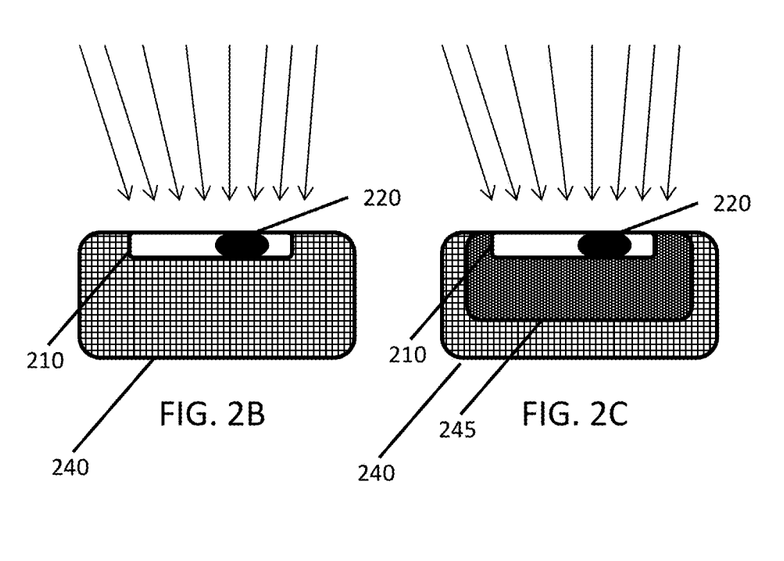
FIG. 2B is a schematic illustration of a neutron detecting device in direct contact with a neutron moderator device according to an exemplary embodiment of the invention.
FIG. 2C is a schematic illustration of a neutron detecting device in direct contact with a neutron moderator device including a high atomic number material according to an exemplary embodiment of the invention.
Figure 3A:
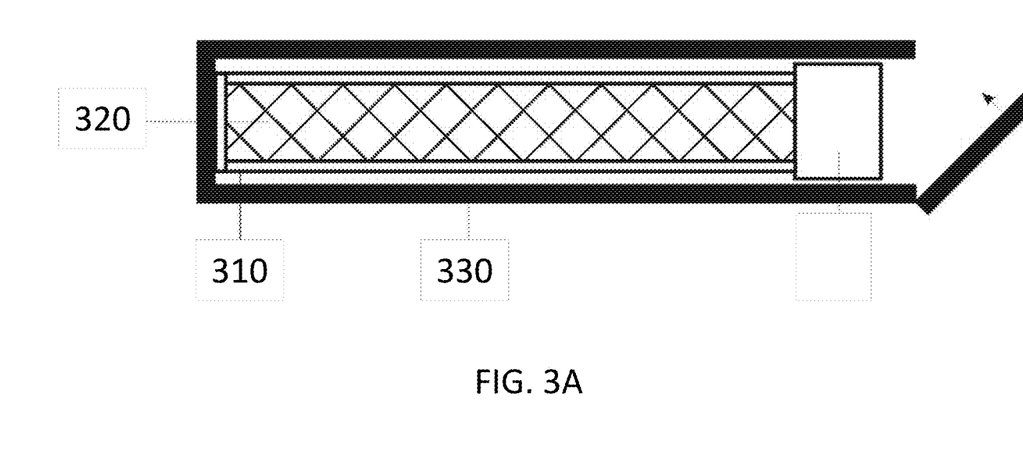
FIG. 3A is a schematic illustration of a highly sensitive neutron detecting device inside a container having outer walls comprising a thermal neutron absorber material according to an exemplary embodiment of the invention.
Figure 3B:
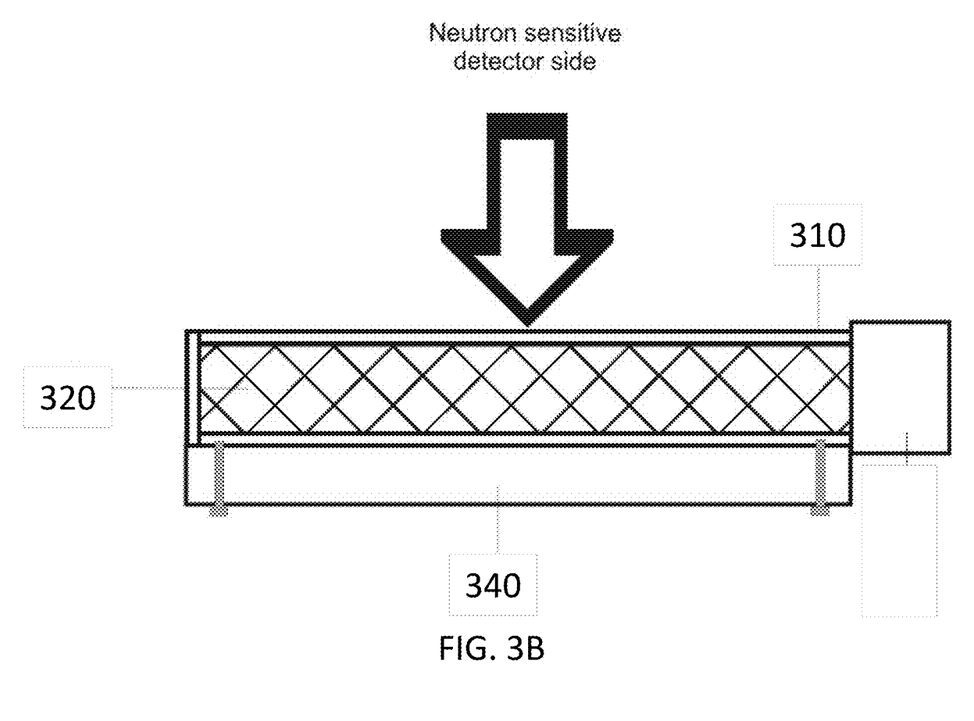
FIG. 3B is a schematic illustration of a highly sensitive neutron detecting device in direct contact with a neutron moderator device including a high atomic number material according to an exemplary embodiment of the invention.
Figure 3C:
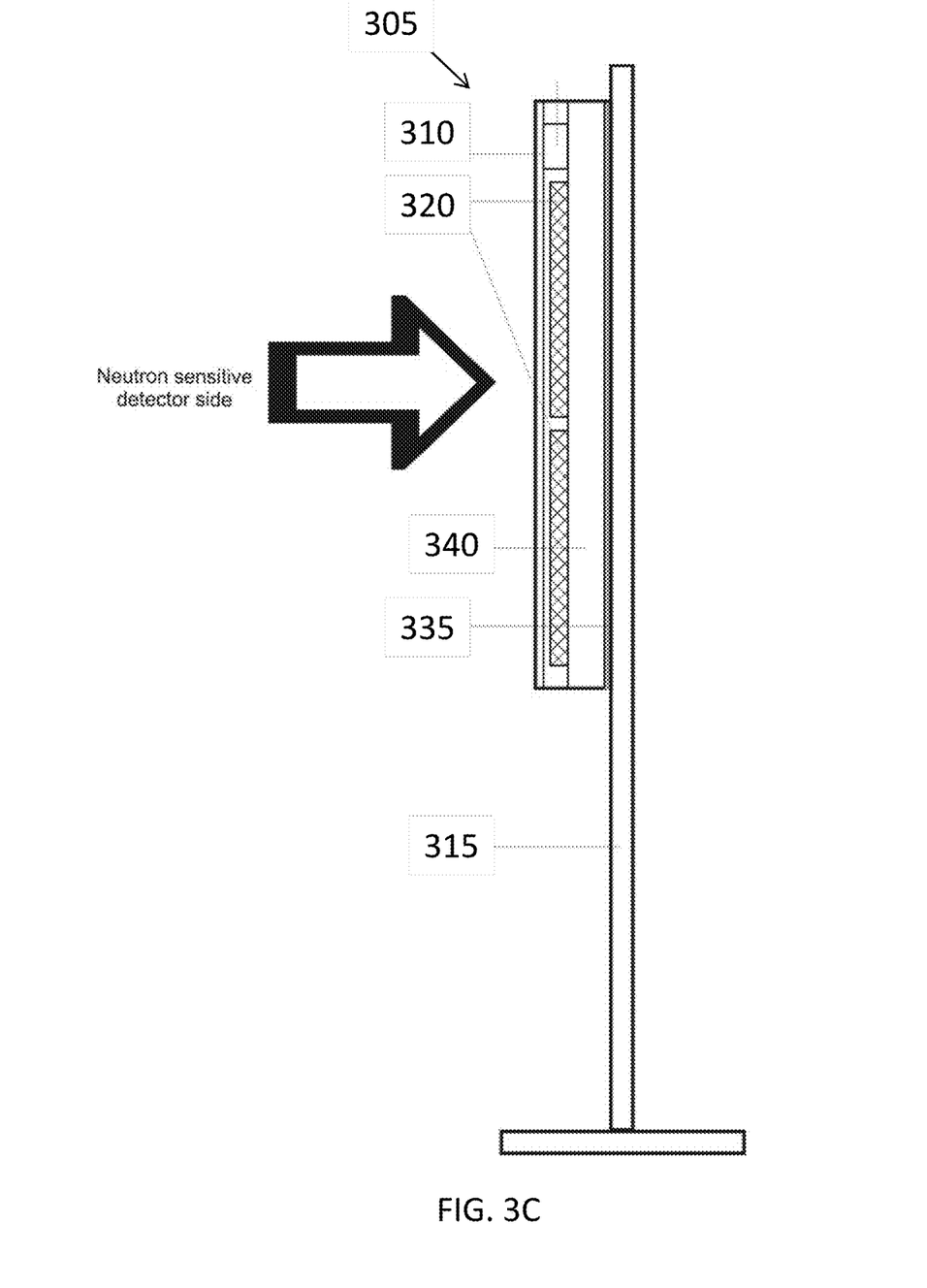
FIG. 3C is a schematic illustration of a highly sensitive neutron detecting device as part of a homeland security portal according to an exemplary embodiment of the invention.
Figure 3D:
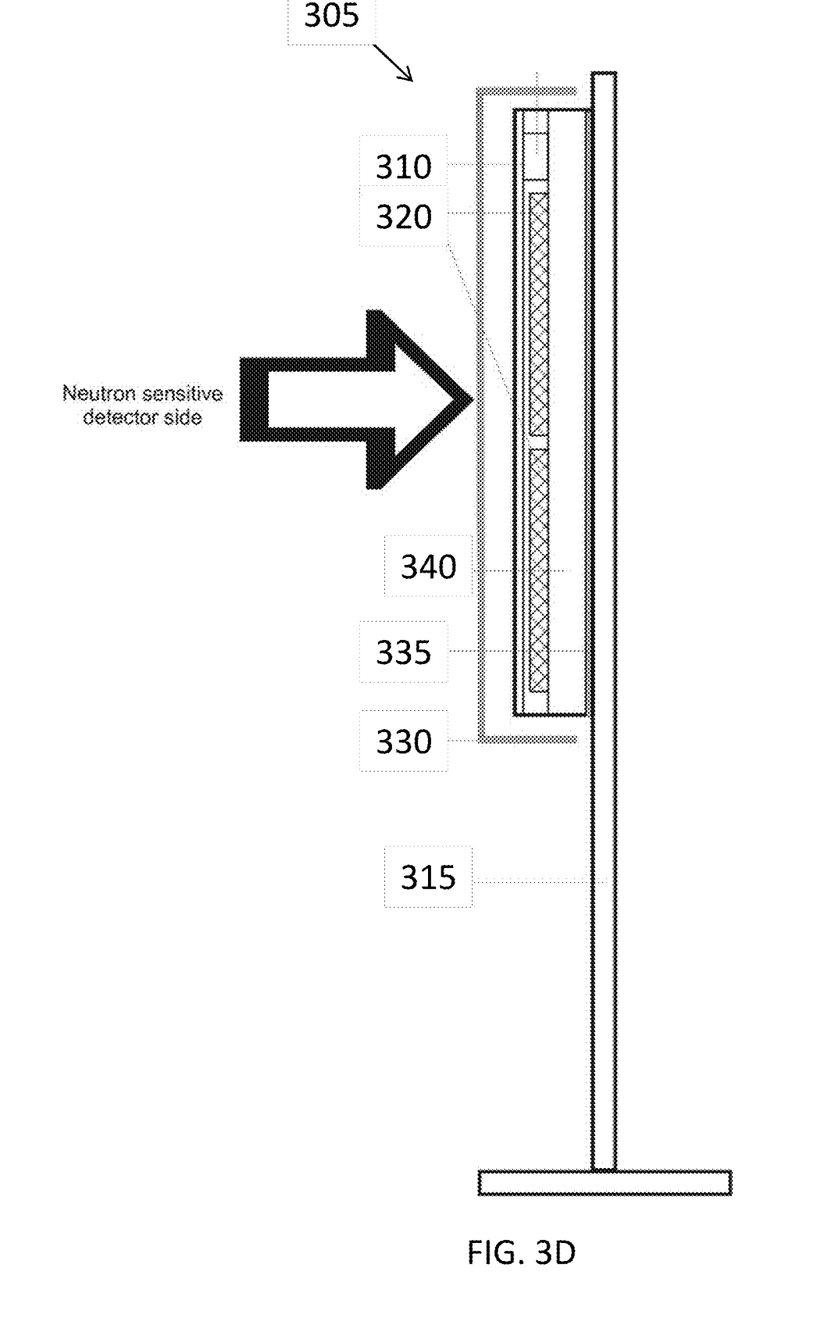
FIG. 3D is a schematic illustration of a highly sensitive neutron detecting device partially enclosed by outer walls comprising a thermal neutron absorber material according to an exemplary embodiment of the invention.

When cosmic rays enter the atmosphere of the earth, they collide with atoms and molecules in the air. The interaction produces a shower of secondary radiation including x-rays, muons, protons, alpha particles, pions, electrons, and neutrons. See T. Nakamura, Cosmic-ray Neutron Spectrometry and Dosimetry, Journal of Nuclear Science and Technology, Supplement 5, pp. 1-7 (2008), hereby incorporated by reference in its entirety (however, where anything in the incorporated reference contradicts anything stated in the present application, the present application prevails). As shown in a flowchart in FIG. 1 using elements shown in FIGS. 2A, 2B, and 2C for a pager type neutron detecting device (size and sensitivity requirements according to IEC 62401 or ANSI 42.32 or IEC 62618 or ANSI 42.48), and FIGS. 3A and 3B for a highly sensitive neutron detecting device (size and sensitivity requirements according to IEC 62534) that includes backpack type radiation detection systems (size and sensitivity requirements according to IEC 62694 or ANSI 42.53) and homeland security portal monitors (size and sensitivity requirements according to IEC 62244 and IEC 62484), respectively, a method 100 of verifying the operational status of a neutron detecting device includes at least partially enclosing at step 110 a neutron detecting device 210 or 310, including a neutron detector 220 or 320 in a container 230 or 330 having outer walls comprising a thermal neutron absorber material, for a time in a range of between 1 hr and 24 hr, depending on the sensitivity of the neutron detector and the local cosmic neutron fluence rate. The walls and inner volume of the container 230 or 330 should not contain anything else except air and the neutron detecting device 210 or 310. The container 230 or 330 is preferably large enough to fully enclose at least one neutron detecting device 210 or 310. The container 230 or 330 can be placed in the basement of a building to reduce the neutron fluence rate. However, if the neutron detecting device 310 is too large to be fully enclosed in a container 330, or is part of a homeland security portal 305 that includes a floor-mounted stand 315, as shown in FIG. 3C, then, as shown in FIG. 3D, the container 330 can have at least one outer wall comprising the thermal neutron absorber material at least partially covering the neutron sensitive detection surface area of the neutron detector 320. The homeland security portal 305 optionally includes a neutron shield 335 behind the neutron detector 320, and, optionally a neutron moderator device 340 described below, located between the neutron detector 320 and the neutron shield 335, as shown in FIGS. 3C and 3D.

The thermal neutron absorber material can include at least one of Boron (B), such as Flexboron of at least 1 mm in thickness, Lithium (Li), Cadmium (Cd), and Gadolinium (Gd). Suitable neutron detectors 220 or 320 include detectors such as scintillation crystals, or gas proportional detectors containing B-10, Li-6, or He-3 that are predominantly sensitive to thermal (energy of 25 meV) and low energy neutrons (energy up to several eV). Since the determinations of count rates described herein typically require several hours, the neutron detecting device 210 or 310 needs to have the capability to record detector counts internally or externally, so that an average count rate can be determined at the end of the exposure time.

The method 100 then includes determining at step 120 an attenuated neutron count rate of the neutron detecting device 210 or 310, and then removing at step 130 the neutron detecting device 210 or 310 from the container 230 or 330, thereby exposing the neutron detecting device 210 or 310 to neutron radiation (indicated by the arrows in FIGS. 2A and 2B and the arrow in FIG. 3B, respectively) originating from cosmic ray background for a time in a range of between 1 hr and 24 hr, such as a time in a range of between 10 hr and 12 hr. The method 100 then includes determining at step 140 an operational neutron count rate of the neutron detecting device 210 or 310, and, at step 145, determining a ratio between the operational neutron count rate and the attenuated neutron count rate. If, at step 150, the operational neutron count rate is higher than the attenuated neutron count rate by at least a predetermined amount and the ratio is in a predetermined range, then the operational status of the neutron detecting device 210 or 310 is verified at step 160. Otherwise, at step 170, the neutron detecting device 210 or 310 requires service, and is no longer operational. The predetermined range for the ratio is typically between 4 and 10 for neutron detecting devices that can be completely surrounded by outer walls made of thermal neutron absorbing material. The predetermined range is smaller for attenuated neutron count rates derived from using a container with partial coverage. If the ratio is substantially outside the predetermined range, then it can be concluded that the measured neutron count rate includes a contribution from some interference, such as electronic noise or spill-over of radiation other than cosmic neutrons. The predetermined range for the ratio and predetermined amount or absolute difference in count rate between the operational neutron count rate and the attenuated neutron count rate depend on design details of the neutron detecting device 210 or 310, the neutron detector 220 or 320, and the neutron absorber container 230 or 330, and are therefore established at the factory. The ratio between the operational neutron count rate and the attenuated neutron count rate is independent of the magnitude of the local cosmic neutron fluence rate if both measurements are performed at the same location.

Figure 4:
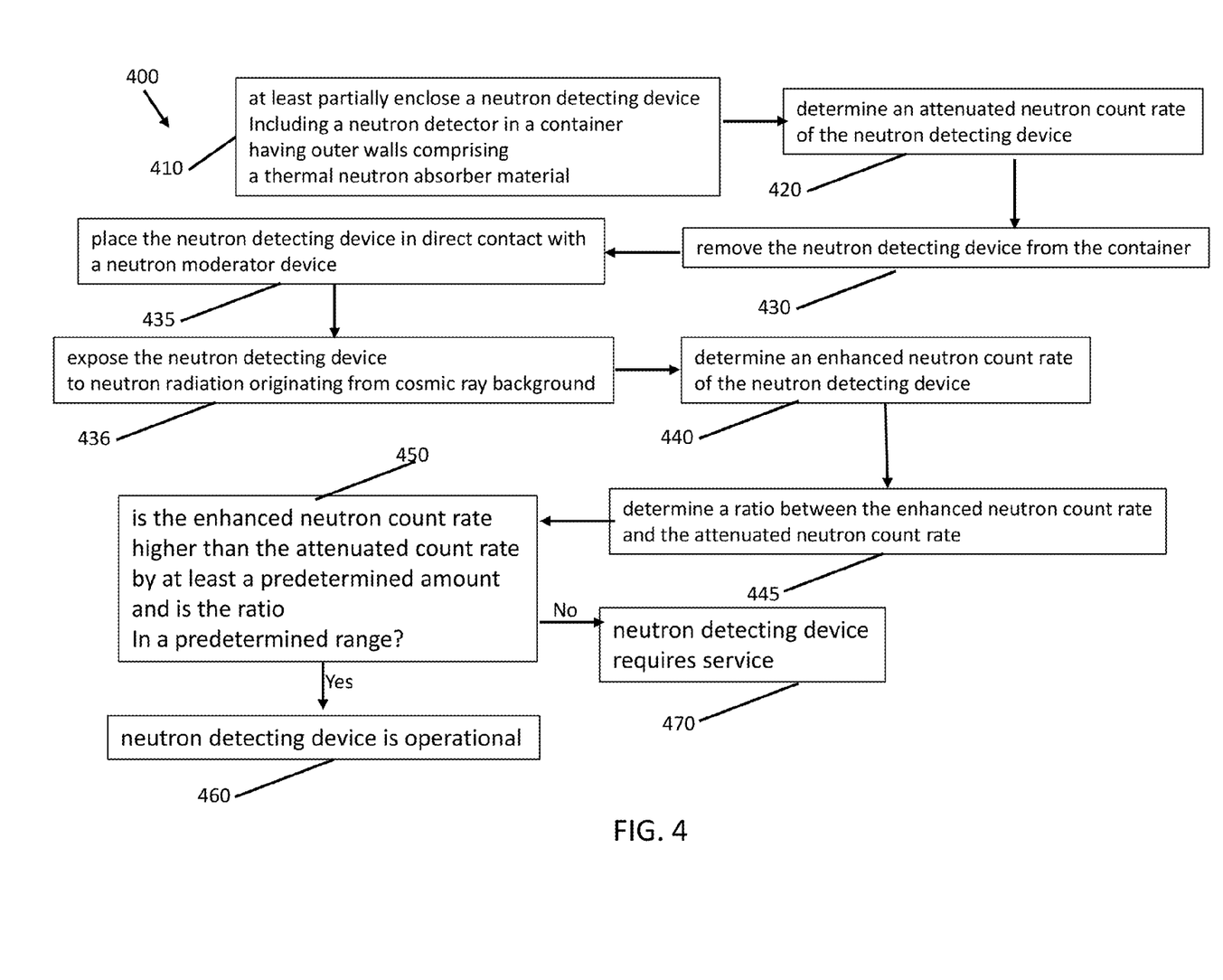
FIG. 4 is a flowchart of a method of operational status verification for a neutron detecting device including placing the neutron detecting device in direct contact with a neutron moderator device according to an exemplary embodiment of the invention.

As shown in a flowchart in FIG. 4, a method 400 of verifying the operational status of a neutron detecting device includes at least partially enclosing at step 410 the neutron detecting device 210 or 310, including a neutron detector 220 or 320 in a container 230 or 330 having outer walls comprising a thermal neutron absorber material as described above for a time in a range of between 1 hr and 24 hr. The container 230 or 330 can be placed in the basement of a building to reduce the neutron fluence rate. The method 400 then includes determining at step 420 an attenuated neutron count rate of the neutron detecting device 210 or 310, and then removing at step 430 the neutron detecting device 210 or 310 from the container 230 or 330. The method 400 then includes placing at step 435 the neutron detecting device 210 or 310 in direct contact with a neutron moderator device 240 or 340 before exposing at step 436 the neutron detecting device 210 or 310 to neutron radiation (indicated by the arrows in FIGS. 2A and 2B and the arrow in FIG. 3B, respectively) originating from cosmic ray background for a time in a range of between 1 hr and 24 hr, determining at step 440 an enhanced neutron count rate of the neutron detecting device 210 or 310, and determining at step 445 a ratio between the enhanced neutron count rate and the attenuated neutron count rate. If, at step 450, the enhanced neutron count rate is higher than the attenuated neutron count rate by at least a predetermined amount and the ratio is in a predetermined range, then the operational status of the neutron detecting device 210 or 310 is verified at step 460. Otherwise, at step 470, the neutron detecting device 210 or 310 requires service, and is no longer operational. The predetermined range for the ratio is typically between 3 and 10. If the ratio is substantially outside the predetermined range, then it can be concluded that the measured neutron count rate includes a contribution from some interference, such as electronic noise or spill-over of radiation other than cosmic neutrons. The predetermined range for the ratio and predetermined amount or absolute difference in count rate between the enhanced neutron count rate and the attenuated neutron count rate depend on design details of the neutron detecting device 210 or 310, the neutron detector 220 or 320, the neutron absorber container 230 or 330, and the neutron moderator device 240 or 340, and are therefore established at the factory. The ratio between the enhanced neutron count rate and the attenuated neutron count rate is independent of the magnitude of the local cosmic neutron fluence rate if both measurements are performed at the same location.

The neutron moderator device 240 or 340 is made of a material containing predominantly hydrogen, such as at least one of polyethylene (PE), polymethylmethacrylate (PMMA), and water. The neutron moderator device 240 is a hemispherical enclosure as shown in FIGS. 2B and 2C. In a preferred design, the neutron detector 220 is embedded into the neutron moderator device 240 on all sides. The thickness of the walls of the neutron moderator device 240 is in a range of between 2 cm and 6 cm, in order to maximize the neutron count rate in the cosmic neutron field.

The neutron moderator device 340 is a plate having a thickness in a range of between 2 cm and 6 cm, which can be a removable part of the instrument. During normal, directional operation of the neutron detecting device 310, neutron moderator plate 340 increases the response to neutron radiation by moderation and backscattering of neutrons impacting the front side of the neutron detector 320. Both neutron moderator devices 240 and 340 give rise to moderation of the impacting medium- and high-energy cosmic neutrons. Furthermore, the walls serve as a partial shielding to thermal neutrons originating from the environment, by, for example, moderation of cosmic neutrons in the surrounding structure material or soil, which could have a variable effect on the measurement results, due to, for example, variance in the water content of the soil. See E. Eroshenko et al., Relationships between cosmic ray neutron flux and rain flows, presented at ECRS (2008), hereby incorporated by reference in its entirety (however, where anything in the incorporated reference contradicts anything stated in the present application, the present application prevails). The measurement location for the enhanced neutron count rate should be selected such that the incoming cosmic radiation is allowed to impact the neutron moderator device preferably with the least possible attenuation. For example, in a building, the neutron detecting device and neutron moderator device should be placed right under the roof and not in the basement.

As shown in FIG. 2C, the neutron moderator device 240 can further include a high atomic number material 245, such as at least one of lead (Pb), tin (Sn), or Tungsten (W) to maximize the production of spallation neutrons next to the neutron detector 220 when high energy cosmic neutrons impact the neutron moderator device 240.

In the embodiments including the neutron moderator device 240 or 340, the method can further include determining a neutron detection efficiency of the neutron detector 220 or 320 based on the difference between the enhanced neutron count rate and the attenuated neutron count rate, thereby calibrating the neutron detecting device 210 or 310. If, for example, the measured difference in neutron count rate is half as large as expected, then the neutron detector 220 or 320 is shown to be sensitive to neutrons, but with a 50% loss in neutron detection efficiency. In order to provide a quantitative calibration in terms of a neutron fluence rate response, the measurement result can be corrected by some external parameters that influence the cosmic neutron fluence rate: air pressure, altitude and geographic latitude. The expected average particle fluence rate is a function of the altitude and, to a lesser extent, the geomagnetic latitude of the location. For neutrons, literature values for sea level exposure and latitudes greater than 50° are in the range of 0.013 n/cm²s, while this value is about half that size for less than 30° geomagnetic latitude. See M. S. Gordon, et al., IEEE Transactions on Nuclear Science, Vol. 51 (6), pp. 3427-3434 (2004), hereby incorporated by reference in its entirety (however, where anything in the incorporated reference contradicts anything stated in the present application, the present application prevails). Locations at 1 km altitude may expect a fluence rate that is about 70% higher than at sea level. Neutron fluence rate variations caused by the local barometric pressure of the atmosphere are in the range of a few percent and can be easily corrected. According to Kowatari et al., the variation is +/−10% between 985 hPa and 1015 hPa. See Kowatari et al., Sequential monitoring of cosmic-ray neutrons and ionizing components in Japan, and Kowatari et al., Altitude Variation of cosmic-ray neutron energy spectrum and ambient dose equivalent at Mt. Fuji in Japan, both references presented at IRPA 11 Madrid, May 2004, and Kowatari et al., Evaluation of the Altitude Variation of the Cosmic-ray Induced Environmental Neutrons in the Mt. Fuji Area, Journal of Nuclear Science and Technology Vol. 42 (6) pp. 495-502 (2005), hereby incorporated by reference in their entirety (however, where anything in the incorporated references contradicts anything stated in the present application, the present application prevails). Measurements outside a building can be especially impacted by the moisture in the soil and may require special considerations regarding the selection of the measurement location.

In one embodiment, particularly suitable for neutron dose rate detectors that are sensitive to fast neutrons (i.e., neutrons with energies greater than or equal to 1 keV), determining the attenuated neutron count rate is performed in a basement of a building, preferably a massive building, in order to reduce the fast neutron component. The method then further includes placing the neutron detecting device that is in direct contact with the neutron moderator device on or directly under the building's roof, a vertical mass layer between the basement and the roof of the building being at least 250 g/cm², preferably greater than 500 g/cm², to achieve at least one attenuation length. See L. D. Hendrick and R. D. Edge, Cosmic-Ray Neutrons near the Earth, Phys. Rev. Vol. 145 (4) pp. 1023-1025 (1966), hereby incorporated by reference in its entirety (however, where anything in the incorporated reference contradicts anything stated in the present application, the present application prevails).

In certain embodiments, the method can further include, after enclosing the neutron detecting device 210 or 310 in the container 230 or 330 having outer walls comprising a thermal neutron absorber material, flying the container 230 or 330 at an altitude suitable for a commercial airliner between a first location and a second location, removing the neutron detecting device 210 or 310 from the container 230 or 330 at the second location, placing the neutron detecting device in direct contact with a neutron moderator device, and then flying the neutron detecting device 210 or 310 at substantially the same altitude back to the first location. As discussed above, the neutron count rate at an altitude of 10 km is about 50 times higher than on ground level, and therefore the calibration measurement can take 10 min instead of 10 hours for a pager type neutron detecting device 210.

While the present invention has been illustrated by a description of exemplary embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of verifying the operational status of a neutron detecting device, the method comprising:
   a. at least partially enclosing a neutron detecting device including a neutron detector in a container having outer walls comprising a thermal neutron absorber material;
   b. determining an attenuated neutron count rate of the neutron detecting device;
   c. removing the neutron detecting device from the container;
   d. exposing the neutron detecting device to neutron radiation originating from cosmic ray background;
   e. determining an operational neutron count rate of the neutron detecting device;
   f. determining a ratio between the operational neutron count rate and the attenuated neutron count rate; and
   g. verifying the operational status of the neutron detecting device if the operational neutron count rate is higher than the attenuated neutron count rate by at least a predetermined amount and the ratio is in a predetermined range.

2. The method of claim 1, wherein the thermal neutron absorber material comprises at least one of Boron (B), Lithium (Li), Cadmium (Cd), and Gadolinium (Gd).

3. The method of claim 1, wherein the container has at least one outer wall comprising the thermal neutron absorber material at least partially covering the neutron detector.

4. The method of claim 1, wherein the predetermined range is between 4 and 10.

5. The method of claim 1, further including placing the neutron detecting device in direct contact with a neutron moderator device before exposing the neutron detecting device to neutron radiation originating from cosmic ray background.

6. The method of claim 5, further including determining an enhanced neutron count rate of the neutron detecting device, and determining a ratio between the enhanced neutron count rate and the attenuated neutron count rate.

7. The method of claim 6, further including determining a neutron detection efficiency of the neutron detector based on the difference between the enhanced neutron count rate and the attenuated neutron count rate, thereby calibrating the neutron detecting device.

8. The method of claim 5, wherein the neutron moderator device comprises at least one of polyethylene (PE), polymethylmethacrylate (PMMA), and water.

9. The method of claim 5, wherein the neutron moderator device is a hemispherical enclosure.

10. The method of claim 5, wherein the neutron moderator device is a plate.

11. The method of claim 5, wherein the neutron moderator device further includes a high atomic number material.

12. The method of claim 11, wherein the high atomic number material is at least one of lead (Pb), tin (Sn), or Tungsten (W).

13. The method of claim 5, wherein determining the attenuated neutron count rate is performed in a basement of a building, and further including placing the neutron detecting device that is in direct contact with the neutron moderator device on or directly under a roof of the building, a vertical mass layer between the basement and the roof of the building being at least 250 g/cm$^2$.

14. The method of claim 1, further including, after enclosing the neutron detecting device in the container having outer walls comprising a thermal neutron absorber material, flying the container at an altitude suitable for a commercial airliner between a first location and a second location, removing the neutron detecting device from the container at the second location, placing the neutron detecting device in direct contact with a neutron moderator device, and then flying the neutron detecting device at substantially the same altitude back to the first location.

* * * * *